United States Patent [19]

Nakanishi

[11] Patent Number: 4,794,479
[45] Date of Patent: Dec. 27, 1988

[54] SHUTTERING MECHANISM FOR A CASSETTE WITH A SHUTTER MOVING ARM

[75] Inventor: Hiroshi Nakanishi, Kanagawa, Japan

[73] Assignee: Sony Corporation, Tokyo, Japan

[21] Appl. No.: 145,691

[22] Filed: Jan. 15, 1988

Related U.S. Application Data

[63] Continuation of Ser. No. 766,990, Aug. 19, 1985, abandoned.

[30] Foreign Application Priority Data

Aug. 20, 1984 [JP] Japan ................. 59-126000

[51] Int. Cl.[4] ............................................. G11B 5/012
[52] U.S. Cl. ................. 360/99.06; 360/133; 360/99.12
[58] Field of Search ................. 360/133, 97–99, 360/86, 137; 206/444

[56] References Cited

U.S. PATENT DOCUMENTS

| 4,320,430 | 3/1982 | Vogt | 360/133 |
| 4,497,009 | 1/1985 | Oishi et al. | 360/133 |
| 4,543,619 | 9/1985 | Pastor | 360/97 |
| 4,581,670 | 4/1986 | Nemoto et al. | 360/133 |
| 4,626,949 | 12/1986 | Brock et al. | 360/133 |

FOREIGN PATENT DOCUMENTS

| 0042311 | 3/1980 | Japan | 360/133 |
| 2103862 | 6/1982 | United Kingdom . | |
| 2101794 | 6/1982 | United Kingdom . | |
| 2113890 | 11/1982 | United Kingdom . | |

Primary Examiner—Stuart N. Hecker
Assistant Examiner—David J. Severin
Attorney, Agent, or Firm—Hill, Van Santen, Steadman & Simpson

[57] ABSTRACT

A window shuttering mechanism for a cassette has (a) a shutter for covering and exposing a window through which a recording medium of the cassette is accessed; (b) a lock for holding the shutter in its closed position in which the window is covered; (c) a projection for releasing the shutter held by the lock from its closed position when the cassette is inserted into a cassette recording/playback apparatus; and (d) a sequential actuator for generating and storing a biasing force as the cassette is inserted into the cassette recording/playback apparatus and laterally engaging the shutter immediately before the projection releases the shutter from its closed position through exertion of the stored biasing force, to move the shutter to expose the window upon continued insertion movement of the cassette and return the shutter to closed condition upon removal movement of the cassette.

7 Claims, 9 Drawing Sheets

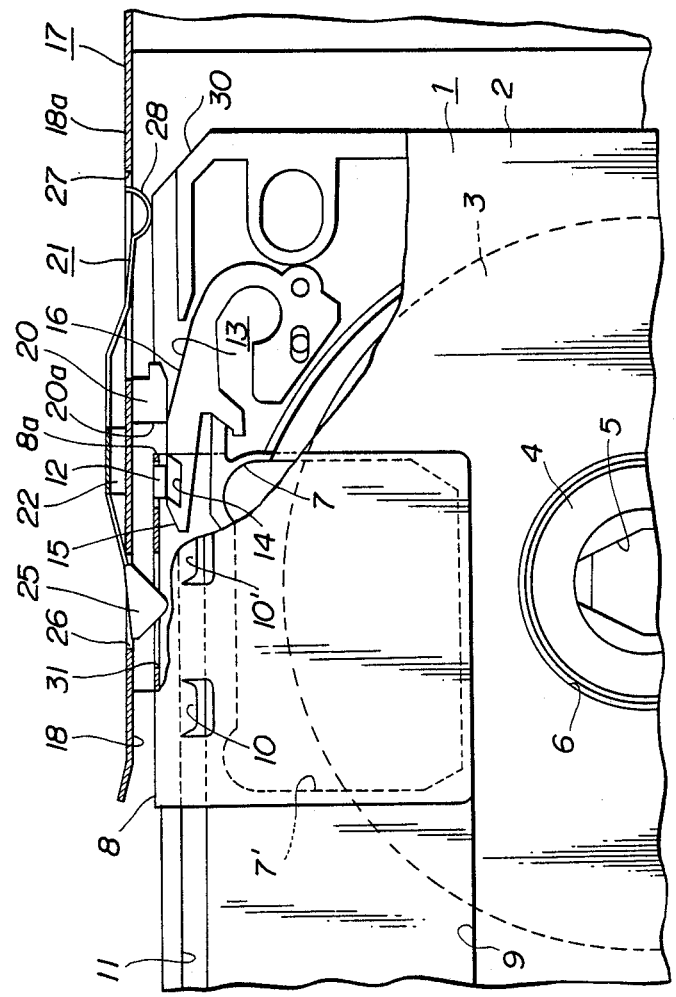

SHUTTERING MECHANISM FOR A CASSETTE WITH A SHUTTER MOVING ARM

This a continuation of application Ser. No. 766,990, filed Aug. 19, 1985, now abandoned.

BACKGROUND OF THE INVENTION

1. Field of the Invention

The present invention relates to a shuttering mechanism for a cassette and particularly relates to a shuttering mechanism requiring no strict dimensional accuracy and requiring no special mechanism in the cassette, wherein a shutter is automatically actuated to its closed position when the cassette is removed from a cassette holder without damage to the cassette.

2. Description of the Prior Art

Since such recording media as magnetic discs often become incapable of recording and playing back when dust or finger grease accumulate on the recording surface, magnetic discs are housed within a cassette to protect the recording surface from such contaminants. In addition, during recording or playback, a record/playback head comes into contact with the magnetic disc via a window built into the cassette. Furthermore, to prevent dust and such from entering the cassette and to prevent fingers from coming into contact with the surface of the magnetic disc via the window, a shutter is added to the cassette to expose and cover the window so that the record/playback head can be brought into contact with the magnetic disc when the shutter is in the open position when the cassette is in use.

However, if an operator fails to close the shutter when the cassette is taken out of the cassette holder, the shutter does not serve its function.

In a conventional shuttering mechanism, a spring is provided on the cassette to bias the shutter towards its closed position and the shutter is opened against the spring force when the cassette is inserted into the cassette holder for recording or playback. When the cassette is taken out of the cassette holder, the shutter is automatically closed due to the spring force.

However, this is disadvantageous in that the spring biasing the shutter toward its closed position adds to the size and weight of cassettes designated for use in small-sized light weight record/playback apparatus. In addition, it takes time to mount these extra parts on the cassette so that the cost of manufacturing such a cassette is increased. Since the cassette is mass-produced and used in large quantities, even a slight increase in the cost covers a large profit loss.

On the other hand, as disclosed in Japanese Patent Application Examined Open No. Sho 51-23,167 published on July 15, 1976, another shuttering mechanism has been proposed in which a swing lever is installed on the cassette holder; when one end of the swing lever is pushed by the cassette, the other end thereof is pivoted toward the cassette and engages a groove formed in the shutter, and as the cassette is then moved within the cassette holder, the shutter is opened or closed automatically.

However, this shuttering mechanism has a drawback. Since it is difficult to control the timing at which the free end of the swing lever moves toward the cassette, one end of the swing lever or the other may slide abrasively along the outer frame of the cassette if the timing is even slightly wrong. Since the outer frame of the cassette is usually made of a synthetic resin, resin dust generated due to abrasion by the swing lever may be deposited on the record/playback apparatus. This dust may subsequently get into the cassette and adhere to the recording surface of the magnetic disc.

SUMMARY OF THE INVENTION

With the above-described disadvantages and drawbacks in mind, it is an object of the present invention to provide a window shuttering mechanism for a cassette, in which the shutter is automatically moved to the closed position in response to removal of the cassette from a cassette holder without provision of special means on the cassette itself. Thus error-free operation can be achieved without strict requirements for dimensional accuracy and without damage to the cassette.

This can be achieved by providing a shuttering mechanism for a cassette comprising: (a) a shutter for covering and exposing a window through which a recording medium of the cassette is accessed; (b) first means for holding the shutter in its closed position in which the window is covered; (c) second means for releasing the shutter held by the first means from its closed position when the cassette is inserted into a cassette recording/playback apparatus; and (d) third means for generating and storing a biasing force as the cassette is inserted into the cassette recording/playback apparatus and positively engaging the shutter immediately before the second means releases the shutter from its closed position through exertion of the stored biasing force, to move the shutter to expose the window upon continued insertion movement of the cassette and to return the shutter to closed condition upon removal movement of the cassette.

BRIEF DESCRIPTION OF THE DRAWINGS

A more complete understanding of the present invention may be obtained from the following description taken in conjunction with the attached drawings in which like reference numerals designate corresponding elements and in which.

DETAILED DESCRIPTION OF THE PREFERRED EMBODIMENT

Reference will be made to the drawings in order to facilitate understanding of the present invention.

First, the construction of a cassette will be described with reference to FIGS. 1 through 3.

Figure 1:
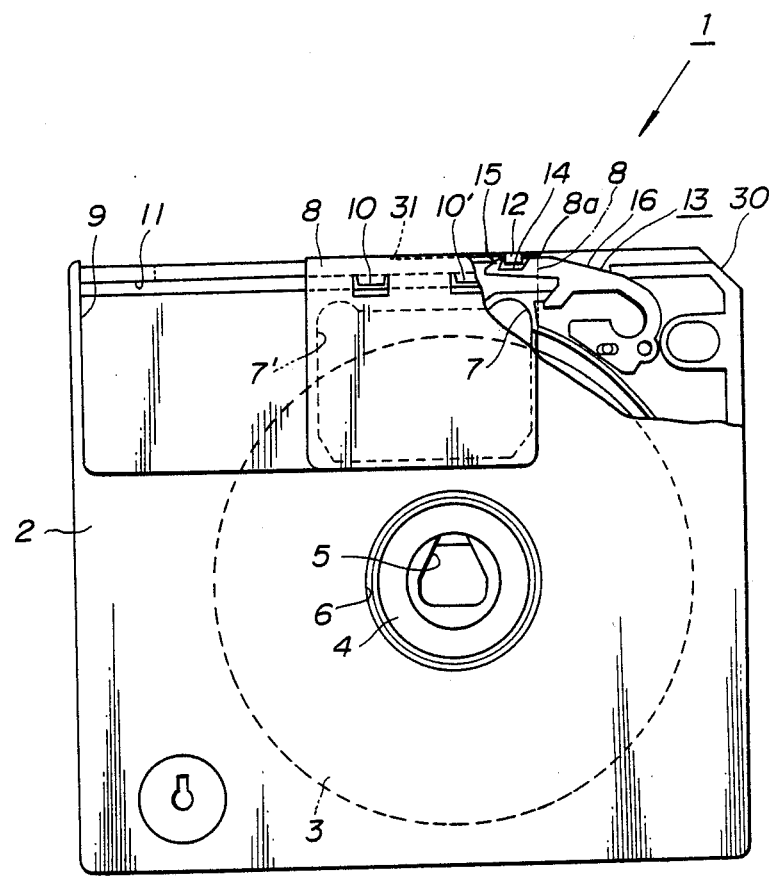
FIG. 1 is a partial cutaway plan view of a cassette embodying the present invention.
Figure 2:
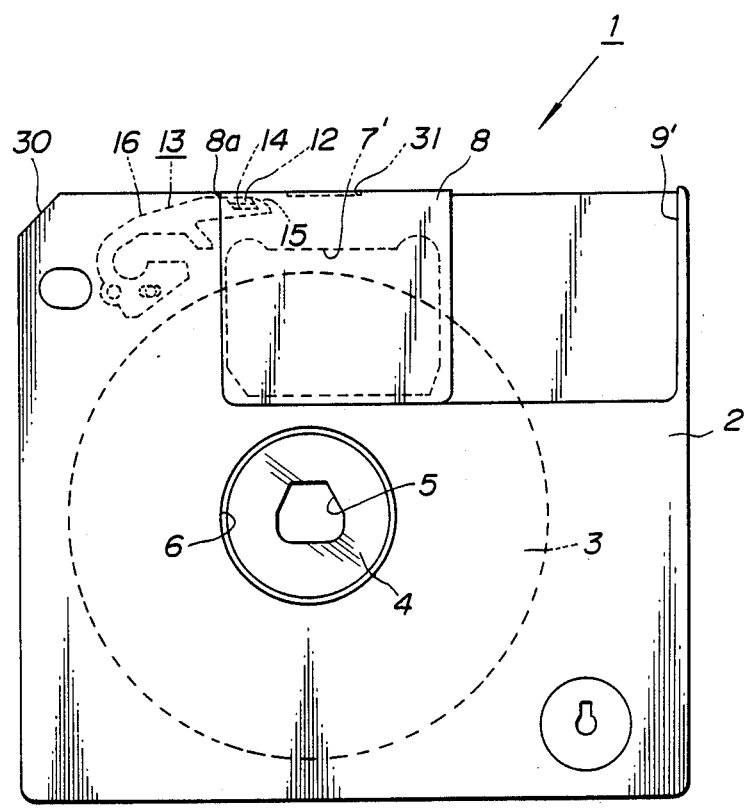
FIG. 2 is a plan rear view of the reverse side of the cassette shown in FIG. 1.
Figure 3:
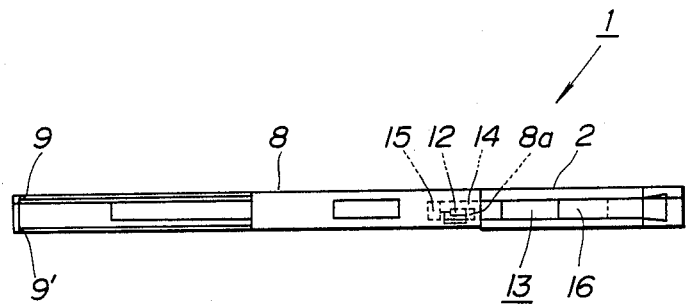
FIG. 3 is an edge-on view of the cassette shown in FIGS. 1 and 2.

In FIGS. 1 through 3, numeral 1 denotes a magnetic disc cassette comprising a cassette frame 2 made of a synthetic resin within which a magnetic disc is rotatably housed. Numeral 4 denotes a central core attached to the center of the magnetic disc 3. An engagement hole 5 is formed at the center of the central core 4. The central core 4 is exposed via central holes 6 in the center of the cassette frame 2.

Numerals 7,7' denote front and rear windows near the upper edge of the cassette frame 2 through which the magnetic disc 3 may be accessed. Numeral 8 denotes a shutter for selectively covering and exposing the windows 7,7'. The shutter 8 is made of thin sheet metal folded over the top edge of the cassette frame 2 so as to have two parallel plates. Thin recesses 9,9' are formed along the tops of both sides of the cassette frame 2, including the windows 7,7', to receive the shutter 8. The shutter 8 is mounted on the cassette frame 2 so as to be free to slide along the thin recesses 9, 9'. Numerals 10 and 10' denote sliders formed by cutting out tabs near the upper edge of one surface of the shutter 8. Numeral 11 denotes a guide groove parallel to the upper edge of the cassette frame 2 with which the sliders 10, 10' are slidably engaged. Numeral 12 denotes a lock tab formed by cutting another tab out of the upper edge of the shutter 8. Numeral 13 denotes a shutter lock lever preferably made of a resilient semielastic synthetic resin. The shutter lock lever 13 is mounted near the upper edge of the cassette frame 2 with its lower end fixed to a pivot in the cassette frame 2. In addition, an engagement cutout 14 is formed in the upper edge of lock lever 13. When the shutter 8 is moved to the closed position, the lock member 12 of the shutter 8 engages the engagement cutout 14 so that the shutter 8 is locked in its closed position. The engagement cutout 14 of the shutter lock lever 13 is tapered to facilitate movement of the shutter 8 toward the closed position and to prevent movement in the opposite direction.

As the shutter 8 moves from its open position to is closed position, the tapered tip 15 of the lock lever 13 abuts the lower edge of the lock 12 to ensure engagement between the engagement cutout 14 and the lock 12 as the shutter lock lever 13 pivots downwards due to its flexibility. In addition, after the lock pawl 12 is once engaged with the engagement cutout 14, some other means is needed to disengage the lock pawl 12 from the engagement cutout 14 by flexing the tip of the shutter lock lever 13 downward. Furthermore, the upper surface 16 of the shutter lock lever 13 opposite the tip 15 is canted at an angle with respect to the upper edge of the cassette frame 2.

Figure 4:
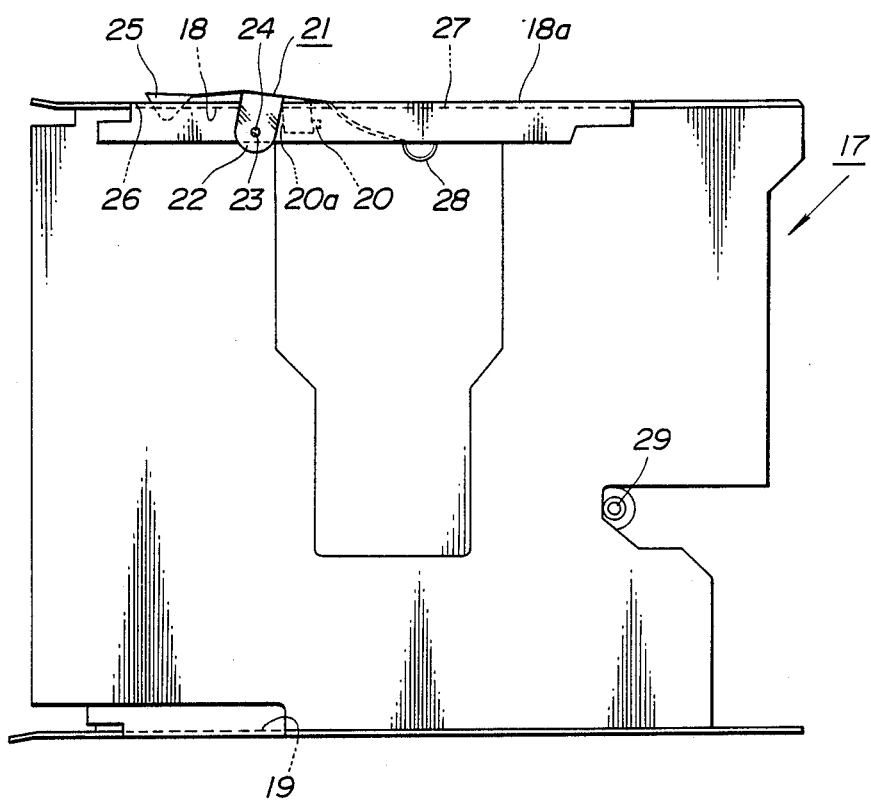
FIG. 4 is an elevation of a cassette holder embodying the present invention.
Figure 5:
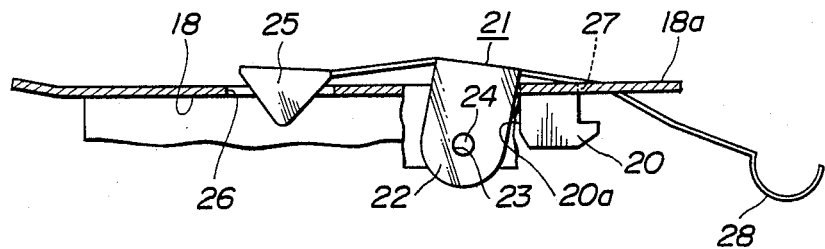
FIG. 5 is an enlarged view in partial section of an essential part of the cassette holder shown in FIG. 4.
Figure 6:
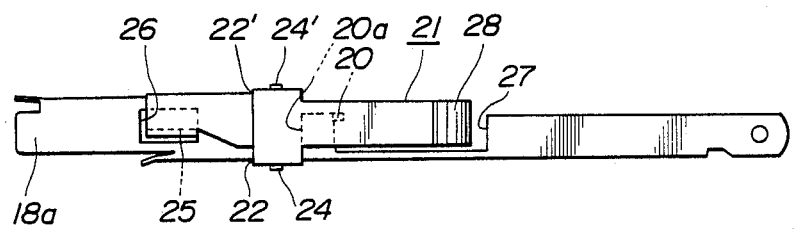
FIG. 6 is a top plan view of the cassette holder shown in FIGS. 4 and 5.

FIG. 4 through FIG. 6 show a construction of a cassette holder.

In FIG. 4, numeral 17 denotes a cassette holder of a record/playback unit (not shown). Guide grooves 18, 19 are wrapped across and to either side of the upper and lower edges of the cassette holder 17 respectively. The cassette 1 is held in the cassette holder 17 so that the upper and lower edges of the cassette 1 slide along the guide grooves 18, 19 respectively, during insertion and removal of the cassette.

Numeral 20 denotes a lock release member projecting downward from the upper edge 18a of the upper guide groove 18.

As the magnetic disc cassette 1 is smoothly inserted into the cassette holder 17, the lock release 20 presses against the slanted surface 16 of the shutter lock lever 13 of the cassette 1, whereby the lever 13 is disengaged from engagement with the lock member 12. The leading edge 20a of the lock release 20 then abuts the leading edge 8a of the shutter 8. Thereafter, as the cassette 1 is further inserted into the cassette holder 17, the shutter 8 is moved toward the open position (refer to FIG. 7(E)) due to the effect of the lock release 20.

Numeral 21 denotes a shutter closer formed of an elastic or resilient material. Supporting pieces 22 are bent so as to project downward from the centers of the edges of the shutter closer 21. Small holes 23 through the supporting pieces 22 engage small projections 24 formed on both sides of the guide groove 18. Thus, the shutter closer 21 is free to pivot through a small range near the upper edge of the cassette holder 17.

An engagement tongue 25 projects downward from one free end of the shutter closer 21. The engagement tongue 25 extends into the interior of the guide groove 18 through a slit 26 formed in the upper edge of the guide groove 18.

The other free end of the shutter closer 21 opposite the engagement tongue 25 from the pivot axis is bent slightly downward into the guide groove 18 through the cutout 27 in the upper edge 18a of the guide groove 18. The tip 28 of the other end of the shutter closer 21 is rounded to form a reaction contact surface.

Numeral 29 denotes a press pin deep in the cassette holder 17. The press pin 29 cooperates with the cassette and is urged by biasing means (not shown) to bias the cassete 1 out the cassette holder 17.

The sequential operation of the above-described shutter mechanism will be described with reference to FIGS. 7(A) through 7(E).

First, when the cassette 1 is inserted into the cassette holder 17 (refer to FIG. 7(A)), the contact end 28 of the shutter closer 21 abuts the slanted upper-inside corner 30 of the cassette frame 2 and follows the slanted surface 30 upwards as the cassette moves inwards (refer to FIG. 7(B)).

Although the lead end of the shutter closer 21 is urged downward, that end of the shutter closer 21 is merely biased in that direction since the engagement tongue 25 is already in close contact with the upper edge 8a of the shutter 8.

As the cassette 1 moves further inward (to the right as viewed in FIG. 7), the engagement tongue 25 of the shutter closer 21 drops into an engagement hole 31 formed in the shutter 8 immediately before the lock pawl 12 of the shutter 8 disengages from the engagement cutout 14 of the lock lever 13. The biasing force on the shutter closer 21 causes the engagement tongue 25 to securely engage the engagement hole 31 of the shutter 8 (refer to FIG. 7(C)).

Figure 7:
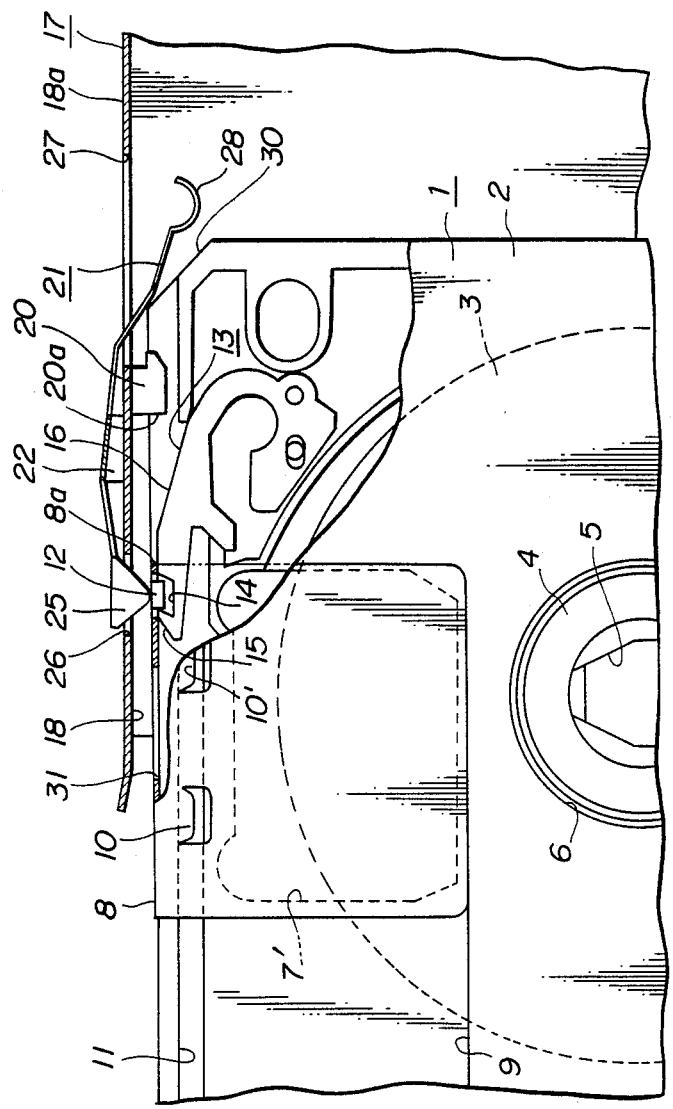
FIGS. 7(A) through 7(E) are cutaway views of a part of the embodiment shown in FIGS. 1 through 6 explaining the operation of a shuttering mechanism according to the present invention.
Figure 7:
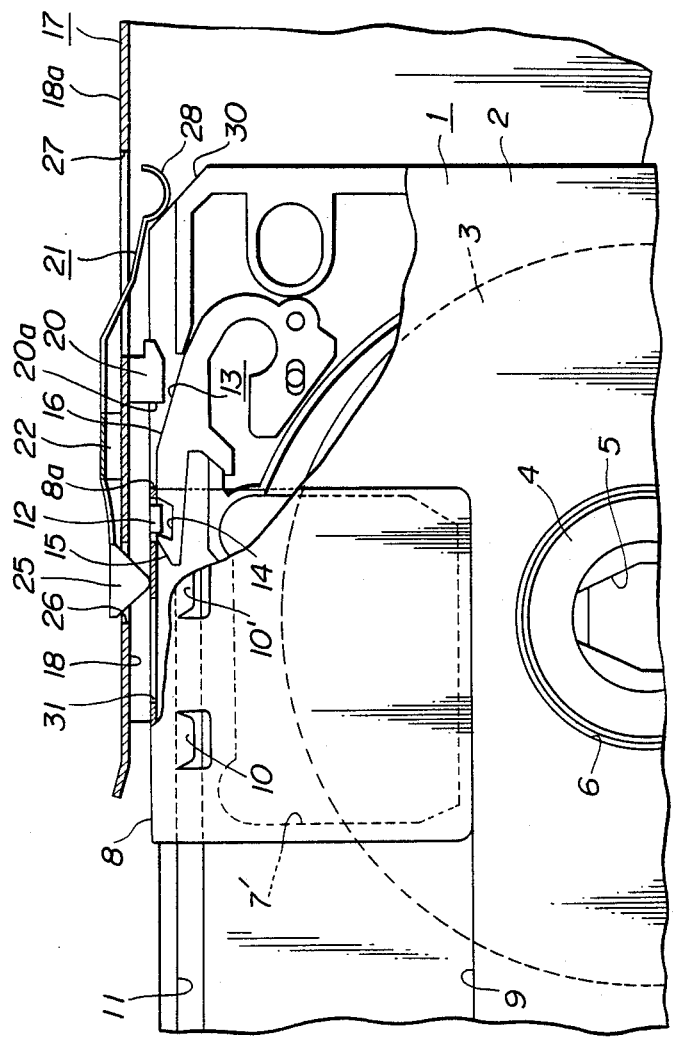
Figure 7:
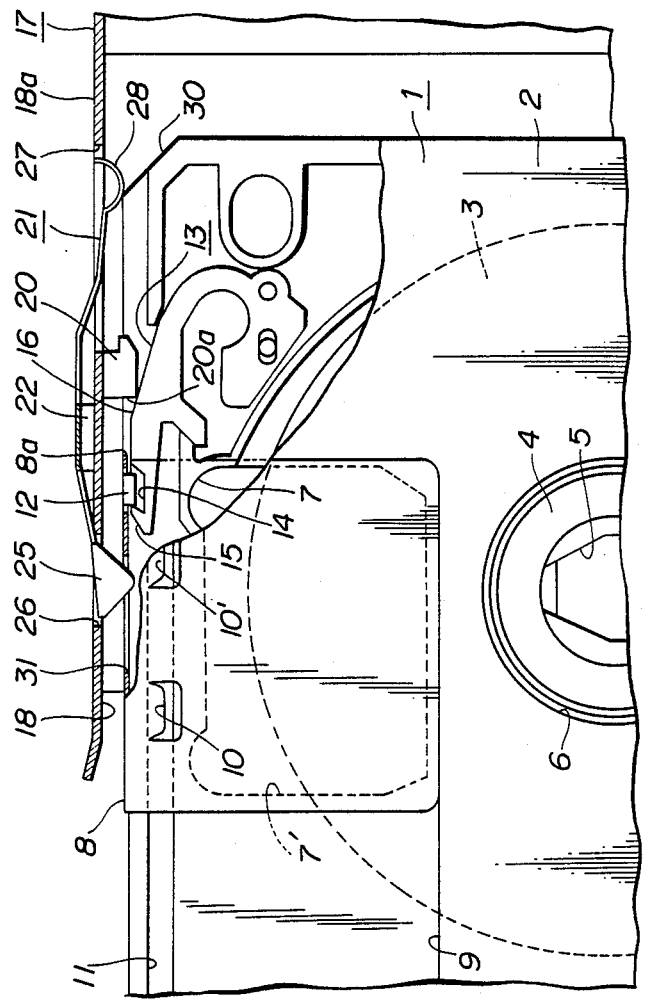
Figure 7E:
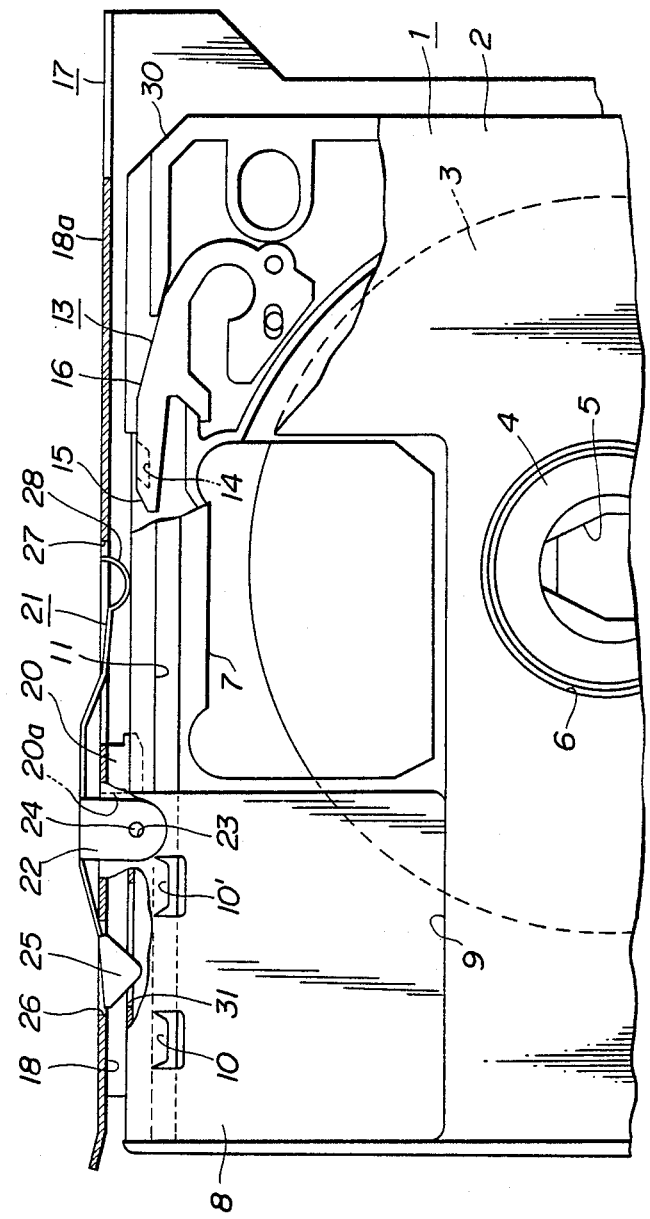

The lock release 20 then moves to the open position (refer to FIG. 7(E)). It should be noted that although the biasing force of the press pin 29 serving to eject the cassette 1 to the removal position is available, the biasing force is not applied to the cassette 1 unless cassette removal is ordered by other means (not shown).

When the cassette 1 is taken out of the cassette holder 17, the shutter 8 operates in the reverse manner. That is to say, when the cassette 1 is first moved toward the open position from the position shown in FIG. 7(E), the engagement tongue 25 engaged with the engagement hole 31 of the shutter 8 pulls the shutter 8 to the closed position shown in FIG. 7(D). Thereafter, after the lock member 12 of the shutter 8 engages the engagement cut-out 14 of the shutter lock lever 13, as shown in FIG. 7(C), the engagement end of the shutter closer 21 flex upward so that the engagement tongue 25 moves out of engagement with the engagement hole 31 of the shutter 8. It should be noted that the engagement tongue 15 is triangular so as to allow smooth disengagement of the tongue 25 from the engagement hole 31.

In this way, the cassette 1 is removed from the holder 17 with the shutter 8 held in place over the windows 7,7' by the lock lever 13. It should be noted although the cassette 1 is ejected in the removed direction by the biasing force stored in the press pin 29, the cassette 1 stops in the position shown in FIG. 7(C) since the engagement tongue 25 of the shutter closer 21 is engaged with the engagement hole 31 of the shutter 8. An operator may then grip the part of cassette 1 which protrudes out of the holder 17 in order to remove the cassette 1.

In this way, if the biasing force applied to the cassette 1 by the press pin 29 is relatively strong, the cassette 1 will not be abruptly ejected all the way out of the cassette holder 17.

In view of the structure described, including the biasing force causing the first end 25 to engage the engagement hole of the shutter immediately before the lock release means releases the shutter, the cassette can be removed from the holder without the need for a spring in the cassette and the shutter will be automatically closed. In addition, since the lock release means is elastic, the biasing force due to contact between the cassette and the second end of the shutter closer is stored in the form of elastic deformation of the shutter closer means until the first end 25 coincides with the engagement hole of the shutter so that the cassette will not be abraded by the lock release means.

Since the first end is engaged with the engagement hole of the shutter, the shutter is completely closed when the cassette is taken out of the cassette holder even when the cassette is taken out with the cassette not completely inserted into the cassette holder.

Furthermore, once the cassette has been fully inserted into the cassette holder, even if the shutter was only half-open, the shutter will be completely closed when the cassette is removed from the cassette holder since the shutter closer will engage the engagement hole of the shutter.

It should be noted that although in the embodiment described above the present invention has been applied to shuttering mechanism for a magnetic disc cassette, the present invention may be applied extensively to shuttering mechanisms for any cassettes having shutters.

It will be clearly understood by those skilled in the art that the foregoing description is made in terms of the preferred embodiment and various changes and modifications may be made without departing from the scope of the present invention as defined by the appended claims.

I claim as my invention:

1. A shutter opening mechanism for a disk cassette record-playback apparatus, said disk cassette being adapted for reciprocal insertion into a cassette holder and having a reciprocally mounted shutter mounted thereon for reciprocation along the direction of insertion of the cassette for covering and exposing a window in the cassette through which a recording medium of the cassette is accessed, and first means on said cassette for positively locking said shutter in a closed position in which said window is covered, said shutter opening mechanism comprising second means on said cassette holder intercepting and releasing said locking means during insertion of the cassette into the cassette holder, and an elongate control arm pivotally mounted on said cassette holder near the center of its length and extending along said direction of insertion, a first end of said control arm having a tongue for positively engaging said shutter immediately before said second means releases said locking means to thereby reciprocate said shutter to expose the window upon further insertion movement of the cassette and to cover said window upon removal of said cassette from said cassette holder, the other end of said control arm having means for contacting the outer periphery of said cassette shutter for pivoting said tongue into position engaging an aperture in said cassette during insertion of said cassette and for allowing said tongue to be withdrawn upon removal of said cassette.

2. The shutter mechanism according to claim 1 wherein said first means comprises a lock member formed on said shutter and a cooperating element at one end of a shutter lock lever resiliently mounted on the cassette for latching engagement with said lock member.

3. The shuttering mechanism of claim 2 wherein the lock member is a projection on the shutter and said cooperating element is a recess.

4. The shuttering mechanism according to claim 2, wherein said second means comprises a projection formed on said cassette holder for intercepting and pressing said shutter lock lever so as to disengage said lock lever from said cooperating element when the cassette is inserted into the cassette holder.

5. The shuttering mechanism according to claim 4, wherein said tongue engages an engagement hole in said shutter, a second end of said control arm being pressed against the cassette as the cassette is inserted into the cassette holder so as to exert a stored biasing force biasing the first end toward the shutter so that the first end enters the engagement hole of the shutter immediately before said lock member is disengaged and remains therein until the shutter is closed and locked as the cassette is withdrawn from the cassette holder.

6. The shuttering mechanism according to claim 5, wherein said control arm is resiliently deformable.

7. The shuttering mechanism according to claim 5, wherein the first end of said control arm has a triangular shaped tongue projected toward the cassette for cooperation with the edges of said engagement hole.

* * * * *